US006922528B2

(12) United States Patent
Okabe (10) Patent No.: US 6,922,528 B2
(45) Date of Patent: Jul. 26, 2005

(54) LIGHT EMISSION CONTROL SYSTEM FOR A FLASH DEVICE

(75) Inventor: Hiroyuki Okabe, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/795,380

(22) Filed: Mar. 9, 2004

(65) Prior Publication Data

US 2004/0179832 A1 Sep. 16, 2004

(30) Foreign Application Priority Data

Mar. 11, 2003 (JP) ........................................ 2003-064990

(51) Int. Cl.$^7$ ............................................. G03B 15/05
(52) U.S. Cl. ....................................... 396/157; 348/371
(58) Field of Search .......................... 396/157, 121–123; 348/370, 371

(56) References Cited

U.S. PATENT DOCUMENTS

| | | | | |
|---|---|---|---|---|
| 5,499,075 A | * | 3/1996 | Sato et al. ................... | 396/157 |
| 6,094,536 A | * | 7/2000 | Harada ....................... | 396/121 |
| 6,560,412 B2 | * | 5/2003 | Iwasaki ...................... | 396/157 |

FOREIGN PATENT DOCUMENTS

| | | | | |
|---|---|---|---|---|
| JP | 8-248468 | 9/1996 | ............ | G03B/7/16 |
| JP | 2002-169194 | 6/2002 | ............ | G03B/7/16 |

OTHER PUBLICATIONS

English Language Abstract of JP 2002–169194.
English Language Abstract of JP 8–248468.

* cited by examiner

Primary Examiner—W. B. Perkey
(74) Attorney, Agent, or Firm—Greenblum & Bernstein, P.L.C.

(57) ABSTRACT

A light emission control system for a flash device includes a plurality of photometering sensors for photometric measurements on different photometering zones; and a controller which outputs a periodic pulsed trigger signal for activating the flash device, and sequentially selects analog signals output from the plurality of photometering sensors to convert the analog signals into digital signals in sequence. The controller outputs the pulsed trigger signal having a predetermined pulse frequency to perform a pre-flash emission operation in which the flash device is activated to discharge intermittently. The controller subsequently converts each analog signal into a corresponding digital signal in sequence in accordance with each trigger pulse of the periodic pulsed trigger signal before performing a main flash emission operation in which the flash device is activated to discharge at a time of exposure.

8 Claims, 5 Drawing Sheets

LIGHT EMISSION CONTROL SYSTEM FOR A FLASH DEVICE

BACKGROUND OF THE INVENTION

1. Field of the Invention

The present invention relates to a light emission control system for controlling light emissions of a flash device, wherein the control system is capable of emitting a preliminary flash emission before a main flash emission.

2. Description of the Related Art

Conventional cameras having a light emission control system for a flash device (electronic flash) in which the amount of light of the main flash discharge is controlled in accordance with photometric readings taken at a pre-flash emission stage (preliminary flash emission), which is emitted before the main flash discharge, are known in the art. However, in a camera in which "split" photometering is possible, it is difficult to photometer the entire photometering area by a single preliminary flash emission.

A light emission control system for a flash device in which a stop timing of light emission of the flash device is controlled with no pre-flash emission with a TTL (through-the-lens) direct photometering system that receives light reflected by a film plane at a time of exposure is known in the art. Such a light emission control system is disclosed in Japanese Unexamined Patent Publication No. 08-248468.

However, in the case of an electronic still camera (i.e., digital camera) which incorporates an image pick-up device such as a CCD image sensor or a CMOS image sensor, it has been proved that a sufficient photometric output cannot be obtained through the TTL direct photometering system because of the low reflectivity of the light-receiving surface of the image pick-up device. Therefore, a TTL direct metering for flash photography is difficult to be performed in conventional electronic still cameras.

SUMMARY OF THE INVENTION

The present invention has been devised in view of the problems noted above. The present invention provides a light emission control system for controlling light emissions of a flash device, wherein the control system makes it possible to achieve a preliminary flash emission with a small power consumption, and further makes it possible to obtain accurate photometric data for a plurality of photometering sensors.

According to an aspect of the present invention, a light emission control system for a flash device is provided, including a plurality of photometering sensors for photometric measurements on different photometering zones; and a controller which outputs a periodic pulsed trigger signal for activating the flash device, and sequentially selects analog signals output from the plurality of photometering sensors to convert the analog signals into digital signals in sequence. The controller outputs the pulsed trigger signal having a predetermined pulse frequency to perform a pre-flash emission operation in which the flash device is activated to discharge intermittently. The controller subsequently converts each of the analog signals into a corresponding one of the digital signals in sequence in accordance with each trigger pulse of the periodic pulsed trigger signal before performing a main flash emission operation in which the flash device is activated to discharge at a time of exposure.

It is desirable for the controller to convert the analog signals into the digital signals in sequence with reference to the trigger pulses which are output from the controller after a predetermined number of trigger pulses of the pulsed trigger signal are output from the controller following the commencement of output of the pulsed trigger signal from the controller.

It is desirable for the controller to convert each of the analog signals into corresponding one of the digital signals after a predetermined period of time elapses from a time at which one of a leading edge and a trailing edge of a trigger pulse of the periodic pulsed trigger signal occurs.

It is desirable for the periodic pulsed trigger signal to be a pulse-width-modulated signal.

It is desirable for the light emission control system and the flash device are incorporated in a camera.

It is desirable for the controller to include a PWM pulse generator, an A/D converter and a memory in which the digital signals are stored.

It is desirable for the camera to include an SLR camera, and wherein the plurality of photometering sensors are provided in a multi-zone photometering sensor unit provided in the vicinity of an eyepiece of the SLR camera.

In another embodiment, a light emission control system for a flash device is provided, including a plurality of photometering sensors for photometric measurements on different photometering zones; and a controller which outputs a periodic pulsed trigger signal for activating the flash device, and sequentially selects analog signals output from the plurality of photometering sensors to convert the analog signals into digital signals in sequence. The controller outputs the pulsed trigger signal having a predetermined pulse frequency to perform a pre-flash emission operation in which the flash device is activated to discharge intermittently. The controller switches the photometering zones, which convert the analogue signals to the digital signals, in synchronization with the pulsed trigger signal before performing a main flash emission operation in which the flash device is activated to discharge at a time of exposure.

The present disclosure relates to subject matter contained in Japanese Patent Application No.2003-064990 (filed on Mar. 11, 2003) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
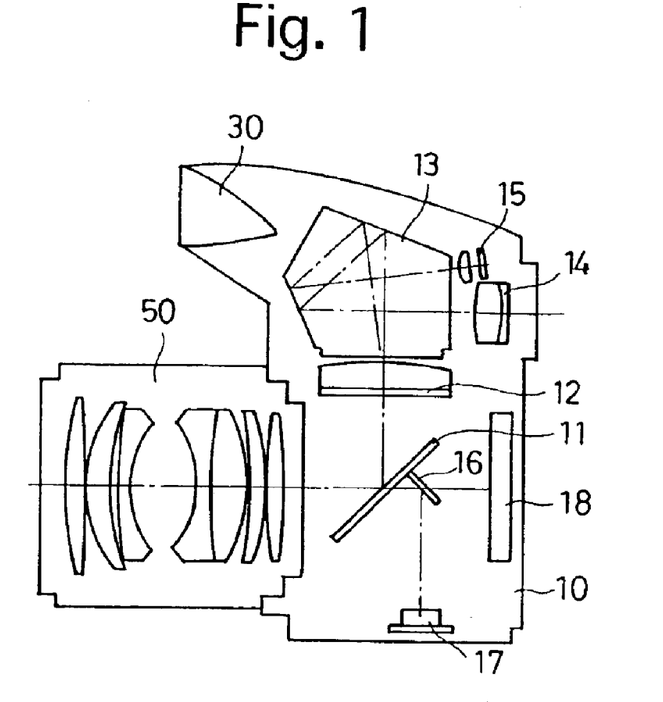
FIG. 1 is a longitudinal cross sectional view of an embodiment of an SLR digital camera to which the present invention is applied, showing only basic components of the SLR digital camera.

FIG. 1 shows an embodiment of an SLR digital camera to which the present invention is applied. This SLR digital camera is provided with a camera body 10 and a photographing lens 50 which is detachably attached to the camera body 10. The camera body 10 incorporates a built-in flash including a light emitting portion 30. The camera body 10 is provided with an image pick-up device 18 which is positioned in the camera body 10 on the image plane formed through the photographing lens 50. The image pick-up device 18 is a two-dimensional color image sensor such as a CCD image sensor or a CMOS (Complementary Metal-Oxide Semiconductor) image sensor.

As shown in FIG. 1, the camera body 10 is provided on an optical axis of the photographing lens 50 with a main mirror (quick-return mirror) 11, a sub-mirror 16 and the image pick-up device 18, in that order from the photographing lens 50. The main mirror 11 is provided at a center thereof with a half mirror portion so that the light passing therethrough is incident on the sub-mirror 16 to be reflected thereby downwards to enter an AF sensor unit 17. The main mirror 11 retracts from an optical path of the photographing lens 50 at a time of exposure so that the object image formed through the photographing lens 50 is focused on the image pick-up device 18.

The camera body 10 is provided above the main mirror 11 with a focusing screen 12. The camera body 10 is provided above the focusing screen 12 with a pentagonal prism 13. The camera body 10 is provided with an eyepiece 14 on an optical path of light emerging from an exit surface of the pentagonal prism 13. The object image formed on the focusing screen 12 is viewed as an erect image through the pentagonal prism 13 and the eyepiece 14.

In a normal image viewing state, object light which is passed through the photographing lens 50 is reflected by the main mirror 11 upwards to be formed as an object image on the focusing screen 12. The user views the image on the focusing screen 12 as an erect image through the pentagonal prism 13 and the eyepiece 14.

A portion of the object light which is passed through the focusing screen 12 is incident on a multi-zone photometering sensor unit 15 which is positioned in the vicinity of the eyepiece 14.

Figure 2:
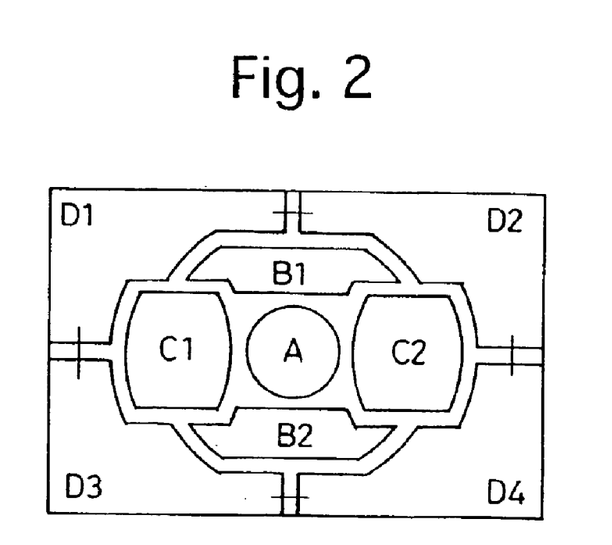
FIG. 2 is a diagram of a photometering area, shown to correspond to a picture plane, of a multi-segment photometering sensor including different photometering zones which is incorporated in the SLR digital camera shown in FIG. 1.

The multi-zone photometering sensor unit 15 is provided with a multi-segment photometering sensor including a plurality of different zone sensors so that a photometering operation can be performed on each of a plurality of different photometering zones. FIG. 2 is a diagram of a photometering area, shown to correspond to a picture plane of the multi-segment photometering sensor of the multi-zone photometering sensor unit 15. The multi-segment photometering sensor of the multi-zone photometering sensor unit 15 has nine different zone sensors: a central zone sensor A, a top-center zone sensor B1, a bottom-center zone sensor B2, a left zone sensor C1, a right zone sensor C2, and four peripheral zone sensors D1 through D4 (a top-left zone sensor D1, a top-right zone sensor D2, a bottom-left zone sensor D3 and a bottom-right zone sensor D4). In the illustrated embodiment, the four peripheral zone sensors D1 through D4 are connected to each other so as to act as one single zone sensor. The central zone sensor A is positioned to correspond to the center of the picture plane to measure the light intensity in a central area of the picture plane. The top-center zone sensor B1 and the bottom-center zone sensor B2 are positioned on vertically opposite sides of the central zone sensor A to measure the light intensity in a top center area and a bottom center area of the picture plane, respectively. The left zone sensor C1 and the right zone sensor C2 are positioned on horizontally opposite sides of the central zone sensor A to measure the light intensity in a left area and a right area of the picture plane, respectively. The top-left zone sensor D1, the top-right zone sensor D2, the bottom-left zone sensor D3 and the bottom-right zone sensor D4 are positioned to surround the central zone sensor A, the top-center zone sensor B1, the bottom-center zone sensor B2, the left zone sensor C1 and right zone sensor C2 to measure the light intensity in a peripheral area of the picture plane. The four peripheral zone sensors D1 through D4 are used to serve as a single peripheral zone sensor D. Accordingly, the light intensity can be measured for each of six different zones in the picture plane with the multi-zone photometering sensor unit 15 in the present embodiment of the SLR digital camera.

On the other hand, the object light which is passed through the half mirror portion of the main mirror 11 is reflected by the sub-mirror 16 downwards to be incident on the AF sensor unit 17. The AF sensor unit 17 is provided with a beam-splitting optical system through which the incident object light (an exit pupil of the photographing lens 50) is split into a plurality of pairs of light bundles, and a corresponding plurality of line sensors on which the plurality of pairs of light bundles (light distributions) are respectively formed.

Upon a photographing operation, the main mirror 11 rises while a focal-plane shutter is opened to start an exposure. Namely, an object image is formed on the image pick-up device 18 through the photographing lens 50 at a shutter release. The image pick-up device 18 converts the received light of an object image into electric charges (corresponding to the brightness of the object image) which are integrated (accumulated) through a large number of photoelectric conversion elements, and outputs an integrated electric charge (electric signal/pixel signal) upon completion of the exposure. This electric signal is image-processed through an image processor (not shown) to be converted into image data in a predetermined format, and is stored in an integrated cash memory of the camera body 10 or a nonvolatile memory such as a removable memory card.

Main components of the present embodiment of the SLR digital camera will be discussed with reference to the block diagram shown in FIG. 3. The camera body 10 is provided with a CPU 21 which serves as a controller for comprehensively controlling the overall operations of the camera body 10. The CPU 21 supplies a constant voltage Vref to the multi-zone photometering sensor unit 15 so that the multi-zone photometering sensor unit 15 can operate. The CPU 21 selects one photometering zone from among the plurality of different photometering zones through three selection lines S1, S2 and S3 to actuate the multi-zone photometering sensor unit 15 so that the multi-zone photometering sensor unit 15 outputs an analog electric signal to the CPU 21. The CPU 21 inputs this electric signal, which is output from the multi-zone photometering sensor unit 15, through a photometric signal line A out to convert the electric signal into a digital signal through an A/D converter 22a which is integrated into the CPU 21. Note that a line GND shown in FIG. 3 serves as a ground line for grounding a grounding terminal of the multi-zone photometering sensor unit 15.

In addition, the CPU 21 controls the operation of a charging circuit 23 so that the light emitting portion 30 emits a pre-flash emission and a main flash emission. In FIG. 3, a charging signal line RIF serves as a line via which the CPU 21 inputs a charging voltage signal from the charging circuit 23, while a trigger signal line FT serves as a line via which the CPU 21 outputs a trigger signal for activating the light emitting portion 30 to the charging circuit 23. In the present embodiment of the SLR digital camera, a pulse generating circuit integrated into the CPU 21, i.e., a PWM pulse generator 22b in the illustrated embodiment shown in FIG. 3, outputs predetermined PWM pulses (pulsed trigger signal) to make the light emitting portion 30 emit a pulse-width modulated light via the charging circuit 23. The pulse frequency of the PWM pulses is very short, e.g., a few tens of micro seconds ($\mu$S).

Figure 3:
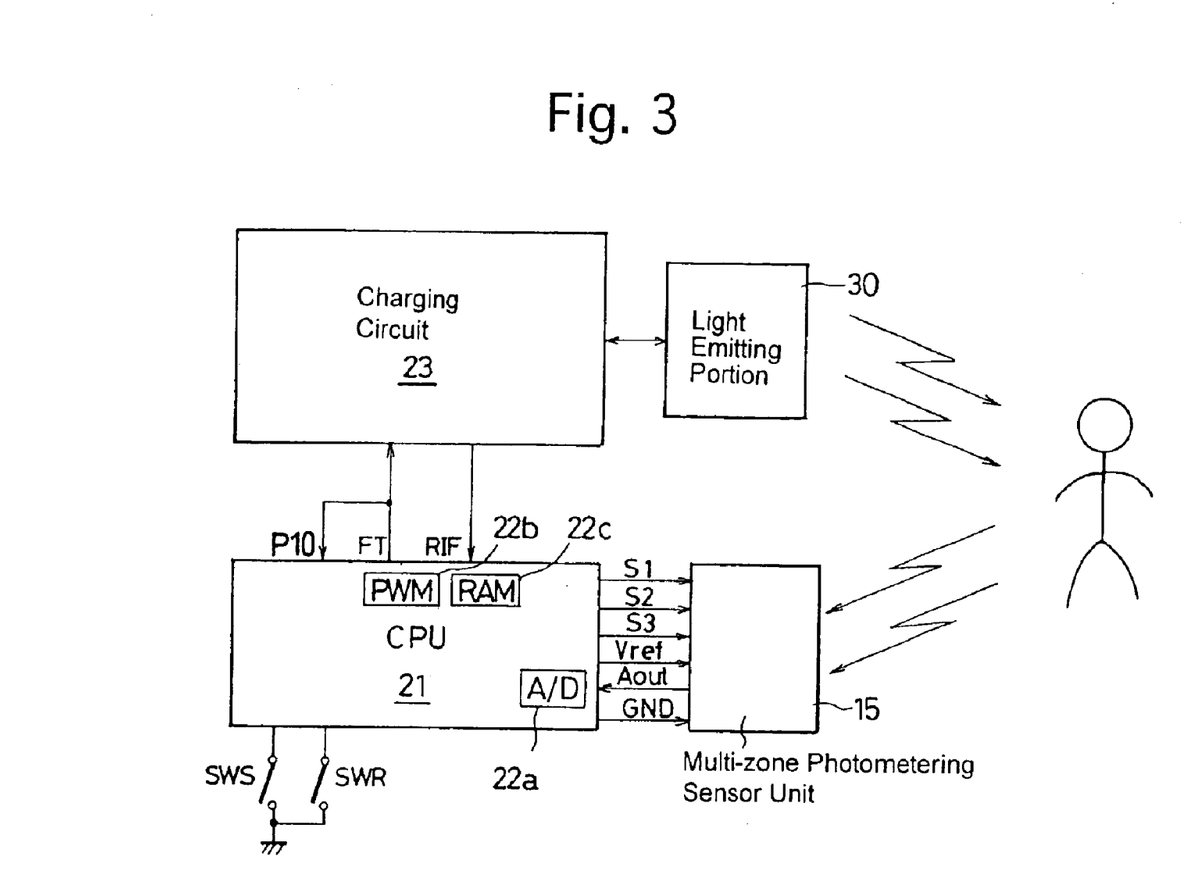
FIG. 3 is a schematic block diagram of an embodiment of electronic components of the SLR digital camera shown in FIG. 1.

In the illustrated embodiment shown in FIG. 3, the level of the trigger signal line FT is checked at a port P10, the six different zones of the multi-zone photometering sensor unit 15 are selected in sequence in accordance with a trailing edge of the checked PWM pulse, and the photometric signal is input to be converted into a digital signal through the A/D converter 22a. The reason why the PWM pulses are checked at the port P10 is that the PWM pulse generator 22b in the illustrated embodiment is constructed to output PWM pulses having a predetermined pulse frequency and a predetermined duty ratio by hardware.

In FIG. 3, SWS represents a photometering switch which is turned ON when a release button (not shown) provided on the camera body 10 is half depressed, and SWR represents a release switch which is turned ON when the release button is fully depressed. The CPU 21 performs a predetermined process upon the photometering switch SWS being turned ON, and also performs another predetermined process upon the release switch SWR being turned ON. In general, a photometering process in which the multi-zone photometering sensor unit 15 is activated for photometric measurements and an exposure value calculating process are performed upon the photometering switch SWS being turned ON. Upon the release switch being turned ON, an exposure process is performed. In the present embodiment of the SLR digital camera, the charging circuit 23 is actuated to start a main-capacitor charging process when a flash photography mode is selected in a state where a main power switch (not shown) of the camera body 10 is ON. Thereafter, a PWM pre-flash emission process (which starts from an operation at step S14 shown in FIG. 5) for flash photography is performed immediately after the release switch SWR is turned ON, and subsequently a main-flash emission process is performed at a time of exposure.

Figure 4:
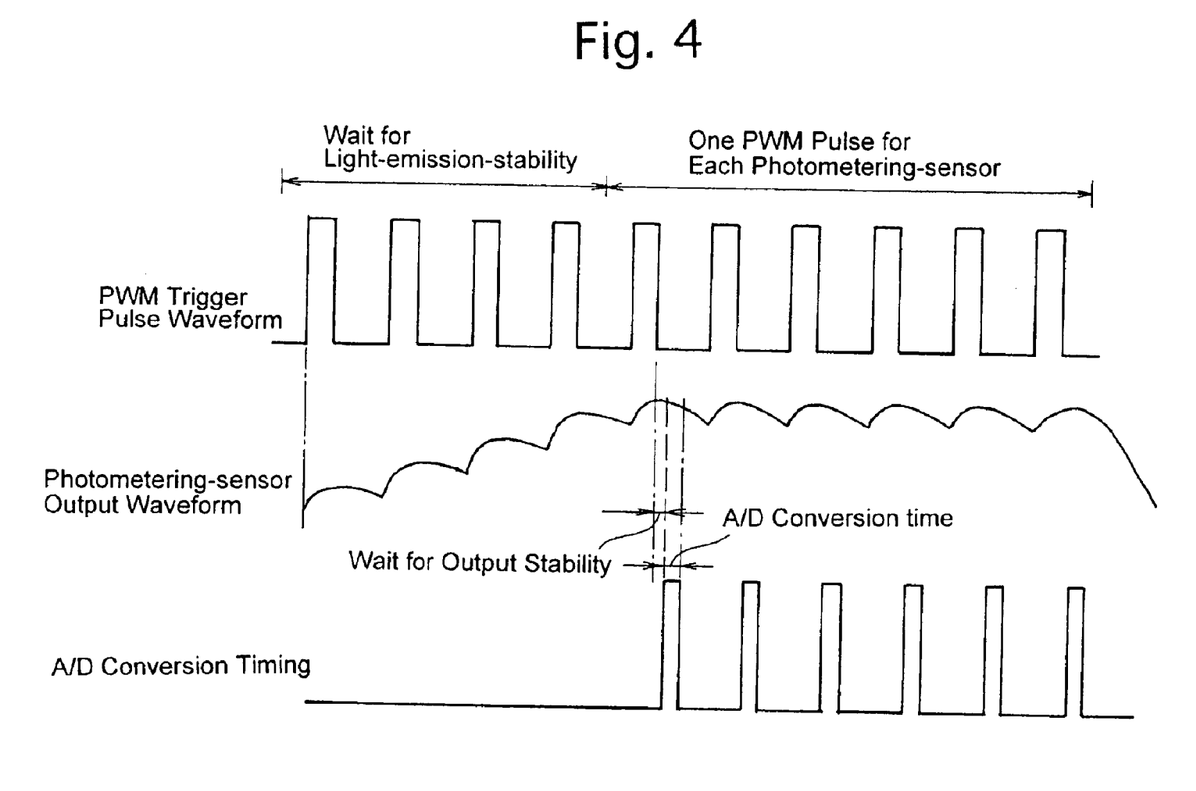
FIG. 4 is a timing chart of a pre-flash emission operation performed in the SLR digital camera shown in FIG. 1.

The PWM pre-flash emission operation, which is a feature of the present invention, will be further discussed hereinafter in detail with reference to the timing chart shown in FIG. 4.

Upon receiving a PWM pulse output from the PWM pulse generator 22b via the trigger signal line FT, the charging circuit 23 starts performing a PWM light-emission operation in which the light emitting portion 30 is activated to discharge only during the time each PWM pulse is at a high level. FIG. 4 shows the waveform of the PWM pulses, which are output from the PWM pulse generator 22b. The pulse frequency, the duty ratio and others of the PWM pulses are predetermined in accordance with the respective characteristics of the charging circuit 23, the light emitting portion 30 and the multi-zone photometering sensor unit 15.

Immediately after the light emitting portion 30 discharges, the multi-zone photometering sensor unit 15 receives light which is emitted by the light emitting portion 30 and reflected by an object, and outputs a photometric signal corresponding to the amount of the received light to the CPU 21 via the photometric signal line Aout. This photometric signal is shown as a waveform of photometering-sensor output in FIG. 4.

A certain period of time is necessary for each of the light emitting portion 30 and the multi-zone photometering sensor unit 15 to generate a stable output. Since the pulse frequency of the PWM pulses is very short in the present embodiment as mentioned above, it is sometimes the case that the light-emission characteristics of the light emitting portion 30 and the output characteristics of the multi-zone photometering sensor unit 15 do not become stable until initial several PWM pulses have been output from the PWM generator 22b. Accordingly, in the present embodiment, control waits a predetermined period of time until the light emitting portion 30 can discharge with stability, specifically, until initial four PWM pulses have been output from the PWM generator 22b after the commencement of output of PWM pulses.

After the four pulses have been output, control waits a predetermined short period of time from the moment (reference time) at which the trailing edge of the subsequent pulse (fifth pulse) occurs, i.e., waits until the light amount becomes maximum (until the output of the multi-segment photometering sensor becomes stable), and subsequently the photometric signal which is input from one of the six different zone sensors (A, B1, B2, C1, C2 and D) of the multi-zone photometering sensor unit 15 via the photometric signal line Aout is converted into a digital signal through the A/D converter 22a.

Thereafter, each time a PWM pulse (trigger pulse) is output, the photometric signal which is input from another one of the six different zone sensors of the multi-zone photometering sensor unit 15 is converted into a digital signal through the A/D converter 22a immediately after a predetermined period of time elapses from the moment at which the trailing edge of the PWM pulse occurs; consequently, the photometric signals which are input from all the six different zone sensors of the multi-zone photometering sensor unit 15 are converted into digital signals through the A/D converter 22a.

In the illustrated embodiment of the SLR digital camera, the PWM pulse generator 22b outputs ten PWM pulses in total in the PWM pre-flash emission operation because one PWM pulse causes the photometric signal output from one zone sensor of the multi-zone photometering sensor unit 15 to be converted into a digital signal. However, if more than one A/D converter is integrated into the CPU 21, more than one photometric signal can be converted into digital signals by the A/D converters in synchronization with a single trigger pulse.

The number of PWM pulses for determining the aforementioned waiting time is predetermined in accordance with the pulse frequency of PWM pulses and the respective characteristics of the charging circuit 23, the light emitting portion 30 and the multi-zone photometering sensor unit 15.

Each digital data generated by the A/D converter 22a is stored in a built-in RAM 22c of the CPU 21. After the digital data for all the six different zone sensors of the multi-zone photometering sensor unit 15 are stored in the built-in RAM 22c, those digital data are read out to be used in arithmetic operations with the photometering process and the exposure value calculating process, which are performed by the operation of the photometering switch SWS, to achieve an optimum exposure control and an optimum light amount for the main flash discharge.

As described above, since the photometric signal output from each of the six different zone sensors (A, B1, B2, C1, C2 and D) of the multi-zone photometering sensor unit 15 is converted into a digital signal in synchronization with the pulsed trigger signal (PWM pulses) while the light emitting portion 30 is activated to discharge intermittently in accordance with the pulsed trigger signal, there is no variation in the timing of the A/D conversion. Consequently, photometric signals can be obtained from the six different zone sensors of the multi-zone photometering sensor unit 15 with precision by driving the built-in flash to discharge intermittently.

Figure 5:
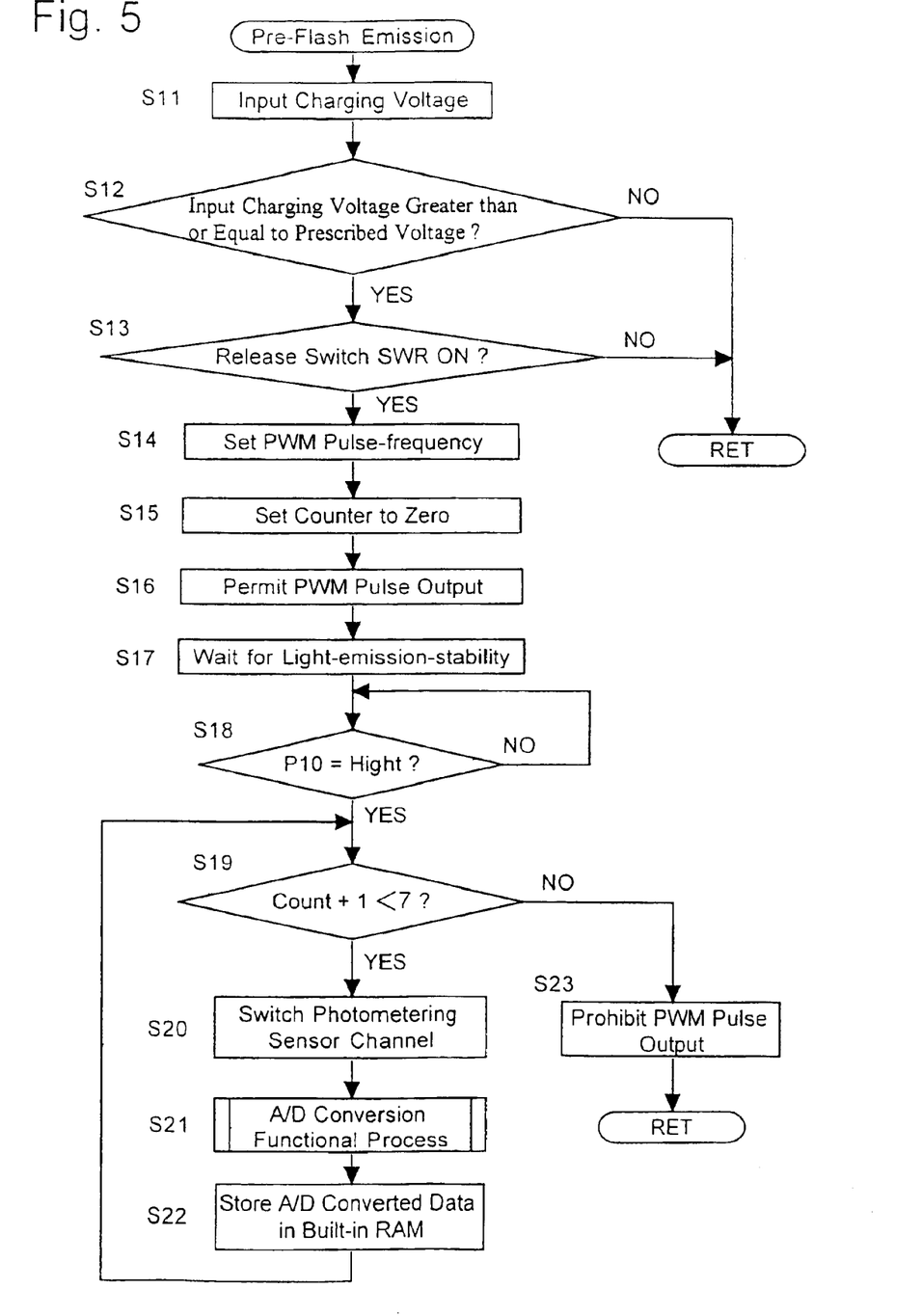
FIG. 5 is a main flow chart of a pre-flash emission control process performed in the SLR digital camera shown in FIG. 1.
Figure 6:
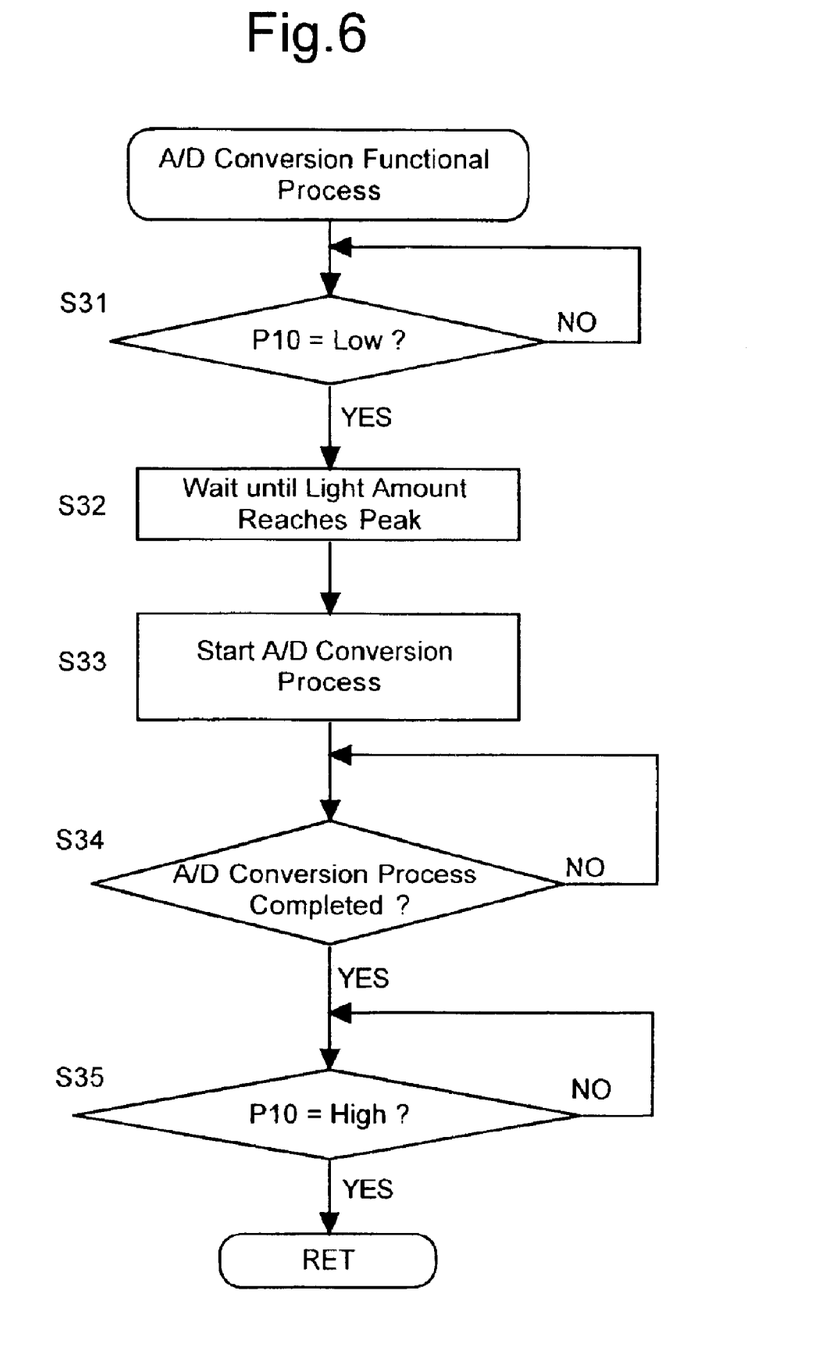
FIG. 6 is a flow chart of an A/D conversion function process in the main flow chart shown in FIG. 5.

The pre-flash emission control process, which is a feature of the present invention, will be discussed hereinafter in detail with reference to FIGS. 5 and 6. This pre-flash emission control process shown in FIG. 5 is a sub-routine included in a main routine of a normal photographing process performed in the present embodiment of the SLR digital camera. Control enters the pre-flash emission control process after predetermined processes such as the photometering process and an autofocus process are performed. This photographing process is performed in a flash photography mode, so that the CPU 21 has commenced a flash discharge preparation operation by making the charging circuit 23 start operating a charging process.

In the pre-flash emission control process, firstly a charging voltage is input from the charging circuit 23 via the charging signal line RIF (step S11). Subsequently, it is determined whether the input charging voltage is equal to or greater than a prescribed voltage (step S12). If the input charging voltage is smaller than the prescribed voltage (if NO at step S12), control returns to the main routine. If the charging voltage is equal to or greater than the prescribed voltage (if YES at step S12), it is determined whether the release switch SWR is ON (step S13). If the release switch SWR is not ON (if NO at step S13), control returns to the main routine. If the release switch SWR is ON (if YES at step S13), control proceeds to a pre-flash emission process starting from step S14. Accordingly, the PWM pre-flash emission operation, which is a feature of the present invention, is performed only when the charging voltage is equal to or greater than a prescribed voltage while the photometering switch SWS and the release switch SWR are turned ON. Operations which are performed when the release switch SWR is turned ON will be hereinafter discussed.

At step S14, the PWM pulse generator 22b is rendered possible to startup by performing a PWM pulse-frequency setting process and other setting processes. Subsequently, the counter value of an integrated counter in the CPU 21 is set at zero (step S15), and the PWM pulse generator 22b is permitted to generate PWM pulses (pulsed trigger signal) at step S16. Upon receiving a PWM pulse output from the PWM pulse generator 22b, the charging circuit 23 starts performing the PWM light-emission operation, in which the light emitting portion 30 is activated to discharge only during the time each PWM pulse is at a high level, in synchronization with the leading edges of the PWM pulses. During this operation, the multi-zone photometering sensor unit 15 receives light which is emitted by the light emitting portion 30 and reflected by an object, and each of the six different zone sensors (A, B1, B2, C1, C2 and D) of the multi-zone photometering sensor unit 15 outputs a photometric signal corresponding to the amount of the received light.

As mentioned above, a certain period of time is necessary for each of the light emitting portion 30 and the multi-zone photometering sensor unit 15 to generate a stable output. Since the pulse frequency of the PWM pulses is very short in the present embodiment, the light-emission characteristics of the light emitting portion 30 and the output characteristics of the multi-zone photometering sensor unit 15 do not become stable until initial several PWM pulses have been output from the PWM generator 22b. Accordingly, in the present embodiment, control waits a predetermined period of time until the light emitting portion 30 becomes capable of discharging with stability, by performing a light-emission-stability waiting operation at step S17. In this operation, control waits until four PWM pulses have been output from the PWM generator 22b.

Immediately after four PWM pulses are detected at step S17, it is determined whether the level at the port P10 (the level of the trigger signal line FT at the port P10) is high (step S18). If the level at the port P10 is not high (if NO at step S18), control repeats the operation at step S18. If it is determined at step S18 that the level at the port P10 is high (if YES at step S18), the counter value of the integrated counter in the CPU 21 is increased by one, and it is determined whether the counter value is smaller than seven (step S19). If it is determined that the counter value is smaller than seven (if YES at step S19), control proceeds to step S20. When control first enters the operation at step S19, the counter value becomes one, so that a photometering sensor channel switching process is performed (step S20). This process is performed using the three selection lines S1, S2 and S3 shown in FIG. 3. In the present embodiment, the central zone sensor A, the top-center zone sensor B1, the bottom-center zone sensor B2, the left zone sensor C1, the right zone sensor C2, and the peripheral zone sensor D (D1 through D4) are selectively switched in sequence from one sensor to another sensor in that order. However, this selection order is optional.

Subsequently, the CPU 21 inputs the photometric signal, which is output from the zone sensor selected from among the six different zone sensors of the multi-zone photometering sensor unit 15, via the photometric signal line Aout to perform an A/D conversion functional process in which the photometric signal (analog electric signal) is converted into a digital signal in synchronization with the trailing edge of the PWM pulse (step S21), and the digitally-converted photometric signal (digital photometric data) is stored in the built-in RAM 22c (step S22). Subsequently, control returns to step S19.

The digital photometric data for all the six different zone sensors of the multi-zone photometering sensor unit 15 are stored in the RAM 22c by repeating the operations at steps S19 through S22. After the operations at steps S19 through S22 for the last sixth zone sensor (i.e., the peripheral zone sensor D in this particular embodiment) are completed, the counter value of the integrated counter in the CPU 21 becomes seven at step S19, so that control proceeds to step S23 from step S19. At step S23 the PWM pulse generator 22b is prohibited from generating PWM pulses (pulsed trigger signal). Subsequently, control returns to the main routine.

The A/D conversion functional process that is performed at step S21 will be hereinafter discussed in detail with reference to the flow chart shown in FIG. 6.

In the A/D conversion functional process, firstly it is determined whether the level at the port P10 is low (step S31). If the level at the port P10 is not low (if NO at step S31), control repeats the operation at step S31. Namely, control waits until the level at the port P10 drops to a low level at step S31. If it is determined at step S31 that the level at the port P10 is low (if YES at step S31), control waits until the light amount reaches its peak (step S32); in other words, control waits until the waveform of the output of the currently-selected zone sensor of the multi-zone photometering sensor unit 15 becomes maximum at step S32. Namely, the operation at step S32 is provided so that control waits a predetermined period of time at step S32.

Immediately after the predetermined period of time elapses at step S32, the A/D converter 22a is actuated to start an A/D conversion process in which the photometric signal which is output from the zone sensor selected at step S20 and input via the photometric signal line Aout is converted into a digital signal by the A/D converter 22a after a lapse of a predetermined period of time from the moment at which the trailing edge of the PWM pulse occurs (step S33). Subsequently, it is determined whether the A/D conversion process is completed (step S34). If the A/D conversion process is not completed (if NO at step S34), control repeats the operation at step S34 to wait until the A/D conversion process is completed.

If it is determined at step S34 that the A/D conversion process is completed (if YES at step S34), it is determined whether the level at the port P10 is high (step S35). If not high (if NO at step S35), control repeats the operation at step S35. Namely, control waits until the level at the port P10 rises to a high level at step S35. If it is determined at step S35 that the level at the port P10 is high (if YES at step S35), control returns to the main routine, specifically proceeds to step S22. The reason why control waits until the level at the port P10 rises to a high level at step S35 is that there is a possibility of control returning to step S31 before the occurrence of the leading edge of the subsequent PWM pulse if control returns to step S21 with the level at the port P10 still remaining a low level.

As can be understood from the above descriptions, according to the present invention, to obtain the photometric data, the photometric signal output from each of the six different zone sensors (A, B1, B2, C1, C2 and D) of the multi-zone photometering sensor unit 15 is converted into a digital signal in synchronization with the pulsed trigger signal (PWM pulses) while the light emitting portion 30 is activated to discharge intermittently in accordance with the pulsed trigger signal in the PWM pre-flash emission operation. Therefore, the photometric data can be obtained at each light emission with a uniform intensity for a given period of time even though the light emitting portion 30 is actuated to discharge intermittently. Moreover, since the light emitting portion 30 is actuated to discharge intermittently in accordance with PWM pulses, a preliminary flash emission can be carried out with a small power consumption.

Although the photometric signal (analog electric signal) which is input from one of the six different zone sensors of the multi-zone photometering sensor unit 15 is converted into a digital signal in synchronization with the trailing edge of a PWM pulse in the above illustrated embodiment, it is possible for the same photometric signal to be converted into a digital signal in synchronization with the leading edge of a PWM pulse. In addition, a set period of time which is necessary for each of the light emitting portion 30 and the multi-zone photometering sensor unit 15 to generate a stable output can be variable so that a most stable output can be obtained for each of the light emitting portion 30 and the multi-zone photometering sensor unit 15 due to a time difference between the moment at which the flash device discharges and the moment at which the photometering sensor receives light which is emitted from the flash device and reflected by an object.

The present invention can be applied to not only an SLR digital camera such as the above described embodiment of the SLR digital camera, but also to a conventional camera using silver-salt film. Additionally, the present invention can be applied to not only an SLR camera but also a lens-shutter type camera.

As can be understood from the foregoing, according to the present invention, since a periodic pulsed trigger signal for activating the flash device is output to perform the PWM pre-flash emission operation while analog signals output from the plurality of photometering sensors are sequentially selected to be converted into digital signals in sequence with reference to trigger pulses of the periodic pulsed trigger signal before the main flash emission operation, a preliminary flash emission with a small power consumption is achieved while obtaining accurate photometric data for a plurality of photometering sensors.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A light emission control system for a flash device comprising:

a plurality of photometering sensors for photometric measurements on different photometering zones; and a controller which outputs a periodic pulsed trigger signal for activating said flash device, and sequentially selects analog signals output from said plurality of photometering sensors to convert said analog signals into digital signals in sequence;

wherein said controller outputs said pulsed trigger signal having a predetermined pulse frequency to perform a pre-flash emission operation in which said flash device is activated to discharge intermittently, and wherein said controller subsequently converts each of said analog signals into a corresponding one of said digital signals in sequence in accordance with each trigger pulse of said periodic pulsed trigger signal before performing a main flash emission operation in which said flash device is activated to discharge at a time of exposure.

2. The light emission control system according to claim 1, wherein said controller converts said analog signals into said digital signals in sequence with reference to said trigger pulses which are output from said controller after a predetermined number of trigger pulses of said pulsed trigger signal are output from said controller following the commencement of output of said pulsed trigger signal from said controller.

3. The light emission control system according to claim 1, wherein said controller converts each of said analog signals into corresponding one of said digital signals after a predetermined period of time elapses from a time at which one of a leading edge and a trailing edge of a trigger pulse of said periodic pulsed trigger signal occurs.

4. The light emission control system according to claim 1, wherein said periodic pulsed trigger signal is a pulse-width-modulated signal.

5. The light emission control system according to claim 1, wherein said light emission control system and said flash device are incorporated in a camera.

6. The light emission control system according to claim 1, wherein said controller comprises a PWM pulse generator, an A/D converter and a memory in which said digital signals are stored.

7. The light emission control system according to claim 5, wherein said camera comprises an SLR camera, and wherein said plurality of photometering sensors are provided in a multi-zone photometering sensor unit provided in the vicinity of an eyepiece of said SLR camera.

8. A light emission control system for a flash device comprising:

a plurality of photometering sensors for photometric measurements on different photometering zones; and a controller which outputs a periodic pulsed trigger signal for activating said flash device, and sequentially selects analog signals output from said plurality of photometering sensors to convert said analog signals into digital signals in sequence;

wherein said controller outputs said pulsed trigger signal having a predetermined pulse frequency to perform a pre-flash emission operation in which said flash device is activated to discharge intermittently, and wherein said controller switches said photometering zones, which convert said analogue signals to said digital signals, in synchronization with said pulsed trigger signal before performing a main flash emission operation in which said flash device is activated to discharge at a time of exposure.

* * * * *